125,886

UNITED STATES PATENT OFFICE.

JULIUS EDMUND DOTCH, OF WASHINGTON, DISTRICT OF COLUMBIA.

IMPROVEMENT IN DEODORIZING NIGHT-SOIL, &c.

Specification forming part of Letters Patent No. 125,886, dated April 23, 1872; antedated April 9, 1872.

Be it known that I, JULIUS EDMUND DOTCH, of Washington, in the District of Columbia, have invented a new and useful Improvement in Deodorizers and Fertilizers, of which the following is a specification:

Specification describing a certain composition for deodorizing night-soil and for transforming the same into a valuable fertilizing compound.

The nature of my invention relates to a new and improved deodorizer or disinfectant and fertilizer; and it consists in the formation of a compound having three important functions, as follows, viz.: First, to fix the ammonia and nitrogenized matter of feces. Second, to destroy all obnoxious and disagreeable odors of feces during putrefaction. Third, to form a poudrette containing all elements of a most perfect one.

In carrying out my invention, I proceed as follows: I mix dry clay, soil, or earth with concentrated sulphuric acid, which I leave in contact for from one to two days. During that time the acid will act on the silicate of alumina, forming sulphate of alumina and free silicic acid. Two advantages are thus gained. First, the sulphate of alumina is present in a finely-divided state, forming a coat over the particles of the undecomposed greater part of the clay, thus presenting a very great surface to the ammoniacal vapors to be deprived of their ammonia, which latter becomes sulphate of ammonia, important simultaneously for the nitrogen as well as for the sulphur contained in it.

It is well known that all seeds require sulphur for their formation, and that not even albumen is free from sulphur. By this action of the sulphuric acid on the clay an equivalent amount of silicic acid is set free, which latter is, under this condition, soluble in a great excess of water, and in this state very important for cereals, as corn, wheat, barley, &c., the stems of which require a large amount of silica.

I add to the above, after one or two days, muriatic acid, simply for increasing the ammonia-absorbing properties, inasmuch as some chloride of aluminium is formed; then I add Chili saltpeter or nitrate of potassa, which has for its principal purpose to destroy any developed sulphureted hydrogen of the feces. The nitrate of soda or potash will act on a part of the sulphate of alumina and chloride of aluminium, forming thus a certain portion of nitrate of alumina, which destroys (just as free nitric acid) every trace of sulphureted hydrogen which is developed from the feces. The nitric acid oxidizes the hydrogen of the sulphureted hydrogen into water, and the sulphur is partly deposited and partly oxidized into sulphuric acid. The nitric acid itself becomes nitrous acid, which again readily takes up oxygen from the air, becoming nitric acid. Thus is nitric acid always regenerated, and simultaneously a certain quantity of sulphuric acid gained.

Sometimes I leave out the muriatic acid entirely and employ some powerful oxidizer, such as nitric compounds, bleaching powder (chloride of lime) or permanganate of potash or soda.

I produce, therefore—by this manner of treating night-soil by means of the above compound—a poudrette which combines all advantages in a sanitary respect as well as in fertilizing properties, which hitherto have not been accomplished.

It will thus be seen that, by my treatment of dry earth or soil, I obtain a powerful disinfectant and deodorizer, which, being mixed with fecal or other matter, thoroughly disinfects and deodorizes it, and at the same time forms a valuable fertilizer or manure.

The same results as are accomplished by nitric acid may be effected by any other oxidizing agent, such as manganate of potash or soda, peroxide of manganese, or bichromate of potash; and these substances can, therefore, be substituted for the acid. A solution of alum may be substituted for the sulphuric acid.

What I claim is—

1. The process, herein described, of treating dry earth, clay, or soil for the formation of a deodorizer or fertilizer, as herein described.

2. I claim the treatment of dry earth, clay, or soil with sulphuric or muriatic acid, in combination with nitric acid or the salts of nitric acid, as herein described.

3. I also claim the employment of powerful oxidizing agents with the above, such as nitric compounds, bleaching-powder, or permanganate of soda or potash, as described.

JULIUS EDMUND DOTCH.

Witnesses:
CHAS. L. COOMBS,
J. SERGEANT BLANKMAN.